US008934736B2

(12) United States Patent
Tanabe et al.

(10) Patent No.: US 8,934,736 B2
(45) Date of Patent: Jan. 13, 2015

(54) IMAGE PROCESSING APPARATUS, IMAGE PROCESSING SYSTEM, AND METHOD FOR HAVING COMPUTER PROCESS IMAGE

(75) Inventors: Yasuki Tanabe, Ichikawa (JP); Takashi Miyamori, Yokohama (JP); Katsuyuki Kimura, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 13/208,143

(22) Filed: Aug. 11, 2011

(65) Prior Publication Data
US 2012/0288205 A1 Nov. 15, 2012

(30) Foreign Application Priority Data
May 11, 2011 (JP) .................................. 2011-106374

(51) Int. Cl.
G06K 9/68 (2006.01)
G06T 1/60 (2006.01)
(52) U.S. Cl.
CPC .... *G06K 9/68* (2013.01); *G06T 1/60* (2013.01)
USPC ........ 382/303; 348/222.1; 382/167; 382/254; 382/293; 382/305
(58) Field of Classification Search
None
See application file for complete search history.

(56) References Cited

U.S. PATENT DOCUMENTS

| | | | | |
|---|---|---|---|---|
| 4,975,976 | A * | 12/1990 | Kimata et al. ................. | 382/293 |
| 6,081,625 | A * | 6/2000 | Sakaue ......................... | 382/254 |
| 7,170,553 | B2 * | 1/2007 | Matsuki et al. ............ | 348/222.1 |
| 2002/0159656 | A1* | 10/2002 | Matsuki et al. ............... | 382/305 |
| 2004/0218813 | A1* | 11/2004 | Okada et al. .................. | 382/167 |

FOREIGN PATENT DOCUMENTS

| | | |
|---|---|---|
| JP | 2005-149001 A2 | 9/2005 |
| JP | 2006-072832 A2 | 3/2006 |
| JP | 2010-257357 A2 | 11/2010 |

OTHER PUBLICATIONS

U.S. Appl. No. 13/052,770, filed Mar. 21, 2011, Tanabe.
Office Action dated Mar. 7, 2014 in Japanese Application No. 2011-106374.

* cited by examiner

*Primary Examiner* — Tsung-Yin Tsai
(74) *Attorney, Agent, or Firm* — Knobbe Martens Olson & Bear LLP

(57) ABSTRACT

According to one embodiment, an image processing apparatus connectable to a main memory in which a plurality of pixel values of unconverted image is stored and a cache memory including a plurality of cache blocks. The apparatus includes a counter, a coordinate determination module, a memory controller, a cache access module, a pixel value calculator, and an output module. The counter determines a coordinate within converted image according to a predetermined execution sequence. The coordinate determination module determines a plurality of coordinates within unconverted image of the pixel values of unconverted image necessary to calculate a pixel value of converted image corresponding to the coordinate within converted image. The memory controller transfers the pixel values of unconverted image stored in the main memory to the cache blocks corresponding to each of the coordinates within unconverted image. The cache access module reads out all the pixel values of unconverted image necessary to calculate the pixel value of converted image from the cache blocks. The pixel value calculator calculates the pixel value of converted image by referring to the pixel values of unconverted image read out by the cache access module. The output module outputs the pixel value of converted image.

12 Claims, 15 Drawing Sheets

| X-COORDINATE | Y-COORDINATE | CLASS |
|---|---|---|
| EVEN | EVEN | P1 |
| ODD | EVEN | P2 |
| EVEN | ODD | P3 |
| ODD | ODD | P4 |

FIG. 9

| X-CORDINATE NUMBER OF PIXELS STORED IN ONE CACHE LINE | (Y-COORDINATE) MOD (REFFERENCE PIXEL IN Y-DIRECTION) | CLASS |
|---|---|---|
| EVEN | 0 | P1 |
| ODD | 0 | P2 |
| EVEN | 1 | P3 |
| ODD | 1 | P4 |
| EVEN | 2 | P5 |
| ODD | 2 | P6 |
| EVEN | 3 | P7 |
| ODD | 3 | P8 |

FIG. 15

IMAGE PROCESSING APPARATUS, IMAGE PROCESSING SYSTEM, AND METHOD FOR HAVING COMPUTER PROCESS IMAGE

CROSS REFERENCE TO RELATED APPLICATIONS

This application is based upon and claims the benefit of priority from the prior Japanese Patent Application No. 2011-106374, filed on May 11, 2011, the entire contents of which are incorporated herein by reference.

FIELD

Embodiments described herein relate generally to an image processing apparatus, an image processing system, and a method for having a computer process image.

BACKGROUND

A conventional image processing apparatus calculates a pixel value of converted image by referring to pixel values of unconverted image stored in a main memory. The image processing apparatus includes a cache memory in which pixel values of unconverted image can be stored in order to decrease the number of times of access to the main memory. When calculating the pixel value of converted image, first the image processing apparatus confirms whether the pixel values of the unconverted image is stored in the cache memory. When the pixel values of the unconverted image is stored, the image processing apparatus calculates the pixel values of the converted image by referring to the pixel values of the unconverted image stored in the cache memory. On the other hand, when the pixel values of unconverted image is not stored, the image processing apparatus transfers the pixel values of unconverted image necessary for the calculation of the pixel value of converted image from the main memory to the cache memory.

When the cache memory is composed of a single-port Static Random Access Memory (SRAM), because plural pixel values of unconverted image are stored in different cache lines, it is necessary to obtain cache access plural times to read out all the pixel values of unconverted image necessary for the calculation of the pixel value of converted image. As a result, processing efficiency of the image processing apparatus is degraded.

On the other hand, all the pixel values of unconverted image necessary for the calculation of the pixel value of converted image can be read out by the one-time cache access even if the plural pixel values of unconverted image are stored in the different cache lines, thereby improving the processing efficiency of the image processing apparatus.

For example, when the cache memory is composed of a multi-port SRAM that has ports corresponding to the number of pixel values of unconverted image to be referred to, all the pixel values of unconverted image can be read out by the one-time cache access. However, because a read rate of the multi-port SRAM is slower than that of the single-port SRAM, an operating frequency of a circuit constituting the image processing apparatus is lowered to degrade the processing efficiency of the image processing apparatus. Moreover, when the number of pixel values of unconverted image to be referred to is increased (for example, at least three pixel values of unconverted image), it is necessary to provide the ports corresponding to the number of pixel values of unconverted image. Because generally cost of the SRAM is increased according to the number of ports, the use of the SRAM having the ports corresponding to the number of pixel values of unconverted image also increases cost of the image processing apparatus.

That is, the processing efficiency of the image processing apparatus is degraded when the cache memory is composed of the single-port SRAM. The cost of the image processing apparatus is increased when the cache memory is composed of the multi-port SRAM.

BRIEF DESCRIPTION OF THE DRAWINGS

FIGS. 8 and 9 illustrate classifying pixel value of the embodiment.

FIGS. 14 and 15 illustrate classification of pixel value according to a modification of the embodiment.

DETAILED DESCRIPTION

Embodiments will now be explained with reference to the accompanying drawings.

In general, according to one embodiment, an image processing apparatus connectable to a main memory in which a plurality of pixel values of unconverted image is stored and a cache memory including a plurality of cache blocks. The apparatus includes a counter, a coordinate determination module, a memory controller, a cache access module, a pixel value calculator, and an output module. The counter determines a coordinate within converted image according to a predetermined execution sequence. The coordinate determination module determines a plurality of coordinates within unconverted image of the pixel values of unconverted image necessary to calculate a pixel value of converted image corresponding to the coordinate within converted image. The memory controller transfers the pixel values of unconverted image stored in the main memory to the cache blocks corresponding to each of the coordinates within unconverted image. The cache access module reads out all the pixel values of unconverted image necessary to calculate the pixel value of converted image from the cache blocks. The pixel value calculator calculates the pixel value of converted image by referring to the pixel values of unconverted image read out by the cache access module. The output module outputs the pixel value of converted image.

Figure 1:
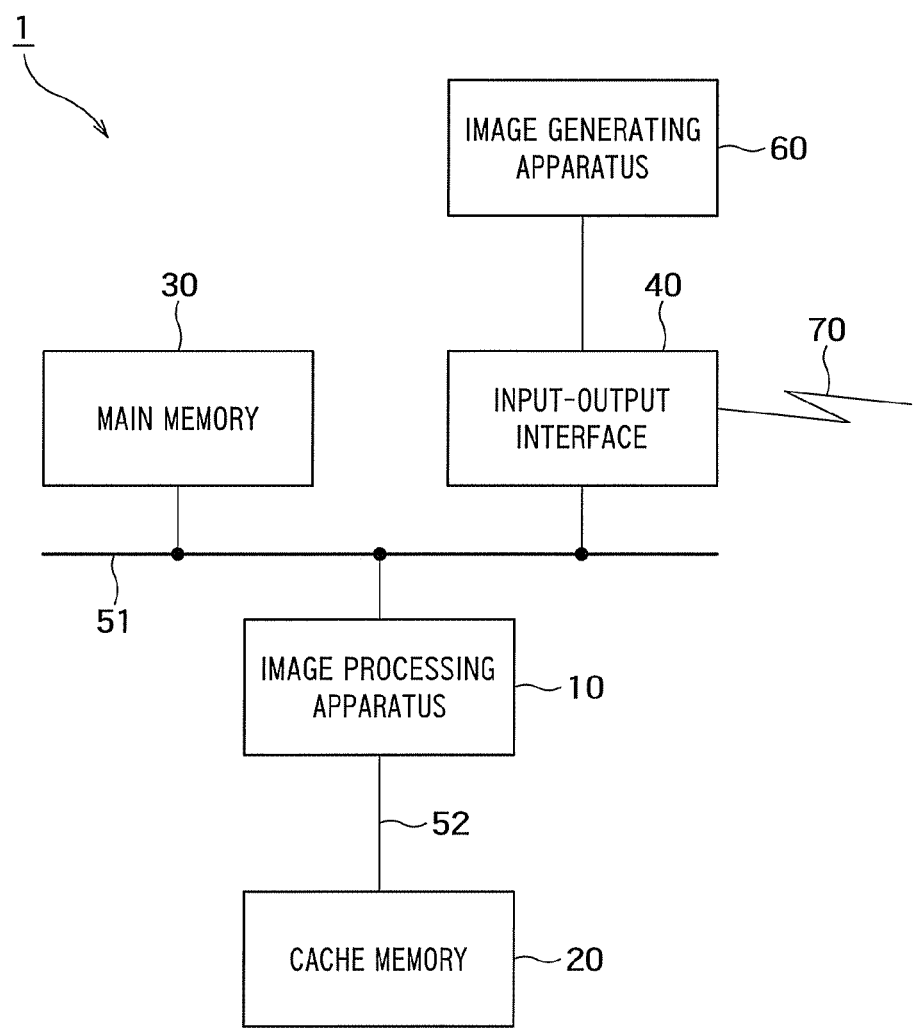
FIG. 1 is a block diagram of the image processing system 1 of the embodiment.

A configuration of an image processing system 1 according to an embodiment will be described. FIG. 1 is a block diagram of the image processing system 1 of the embodiment. FIG. 2 is a schematic diagram illustrating a data structure of image data of the embodiment. The image processing system 1 of FIG. 1 includes an image processing apparatus 10, a cache memory 20, a main memory 30, an input-output interface 40, an external bus 51, an internal bus 52, an image generating apparatus 60, and a network 70. The image processing apparatus 10 is a semiconductor integrated circuit (for example, computer processor) that executes predetermined image processing on image data having plural pixel values. The image processing apparatus 10 is connected to the main memory 30 and the input-output interface 40 via the external bus 51 and the image processing apparatus 10 is connected to the cache memory 20 via the internal bus 52. A conversion pattern is determined by a setting of user who uses the image processing system 1 or a setting of application that implements a function of the image generating apparatus 60. Pixel values of unconverted image are stored in units of cache lines in the cache memory 20. For example, the cache memory 20 is a single-port SRAM. The image data is stored in the main memory 30. For example, the main memory 30 is a Dynamic Random Access Memory (DRAM). The input-output interface 40 is connected to the image generating apparatus 60 and the network 70. The image generating apparatus 60 is a semiconductor integrated circuit (for example, vehicle-mounted camera) that generates the image data. For example, the network 70 is a wired network or a wireless network.

Figure 2A:
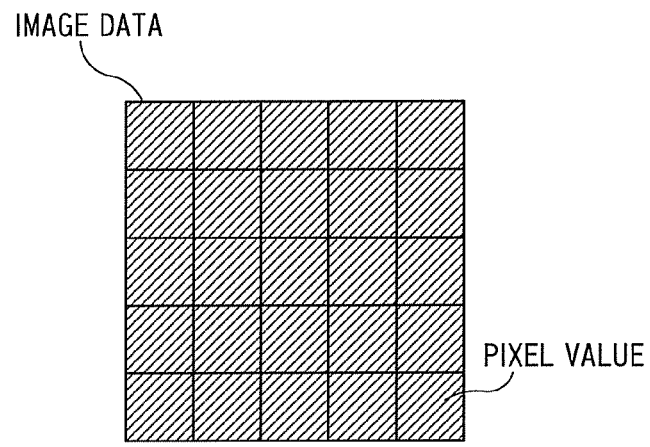
FIGS. 2A and 2B are schematic diagrams illustrating a data structure of image data of the embodiment.
Figure 2B:
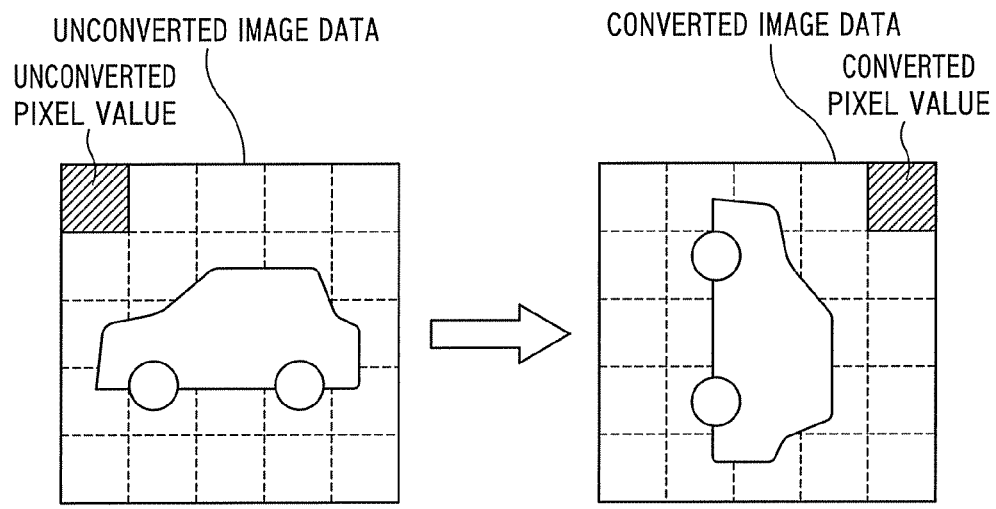

As illustrated in FIG. 2A, the image data includes plural pixel values. Each pixel value includes color information such as information indicating color tone and gradation. In the image processing, an image shape is converted based on a predetermined conversion pattern such as rotation, flip horizontal, flip vertical, enlargement, reduction, and deformation correction. FIG. 2B illustrates a conversion pattern in which the unconverted image data is rotated clockwise by 90°.

Figure 3:
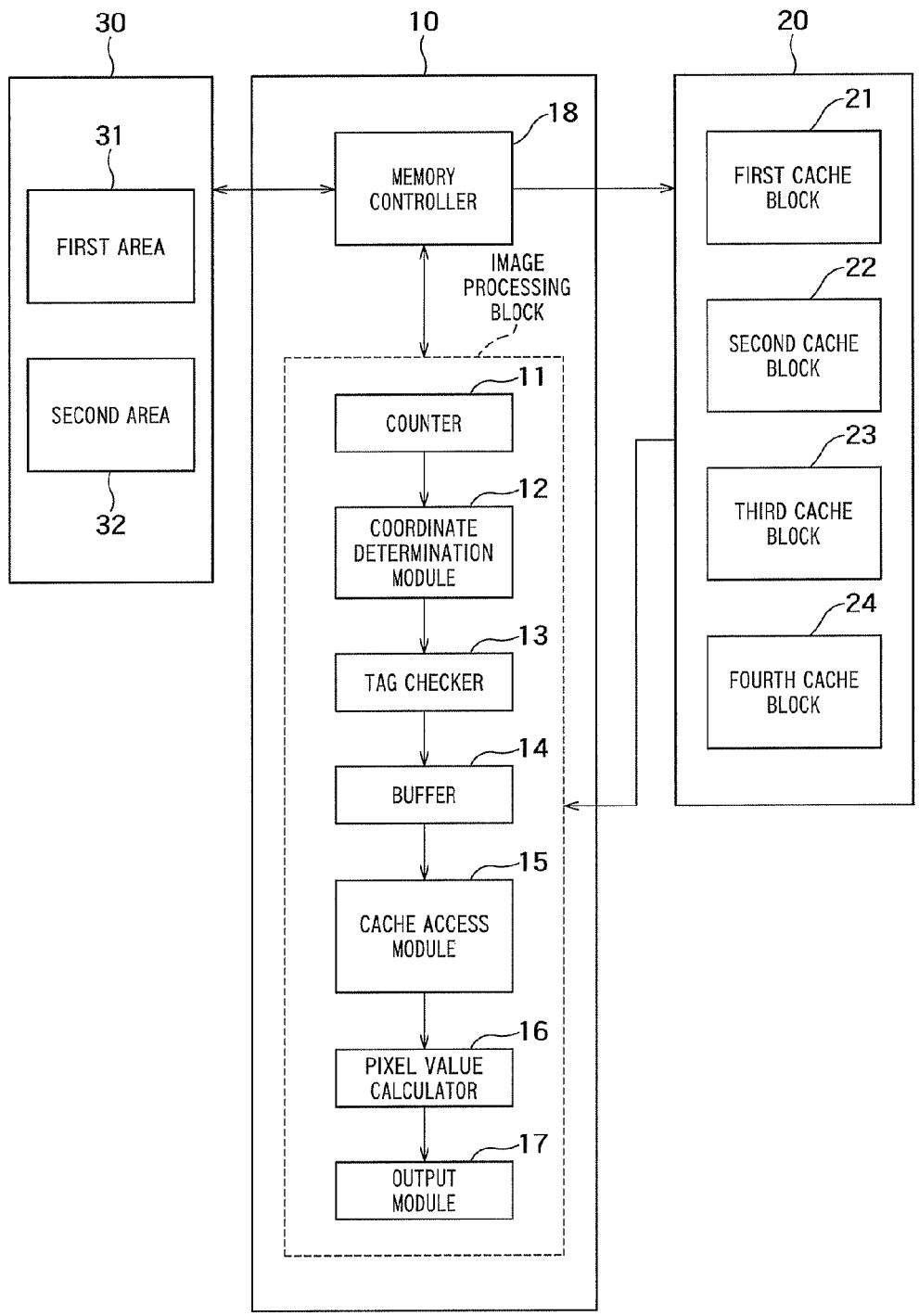
FIG. 3 is a block diagram illustrating the image processing apparatus 10, the cache memory 20, and the main memory 30 of the embodiment.

A configuration of the image processing apparatus 10 of the embodiment will be described. FIG. 3 is a block diagram illustrating the image processing apparatus 10, the cache memory 20, and the main memory 30 of the embodiment. The image processing apparatus 10 includes an image processing block and a memory controller 18. The image processing block includes a counter 11, a coordinate determination module 12, a tag checker 13, a buffer 14, a cache access module 15, a pixel value calculator 16, and an output module 17. The cache memory 20 includes first to fourth cache blocks 21 to 24. The main memory 30 includes a first area 31 and a second area 32. The unconverted image data including plural pixel values of unconverted image is previously stored in the first area 31 in the order of raster scan. The converted image data including plural pixel values of converted image generated by the image processing apparatus 10 is stored in the second area 32.

The memory controller 18 transfers the pixel values of unconverted image stored in the first area 31 of the main memory 30 to the cache block (one of first to fourth cache blocks 21 to 24) corresponding to a coordinate within unconverted image. The image processing block calculates the pixel value of converted image by referring to the pixel values of unconverted image stored in the first to fourth cache blocks 21 to 24. The memory controller 18 transfers the pixel value of converted image calculated by the image processing block to the second area 32 of the main memory 30. Therefore, the converted image data is stored in the main memory 30.

Figure 4:
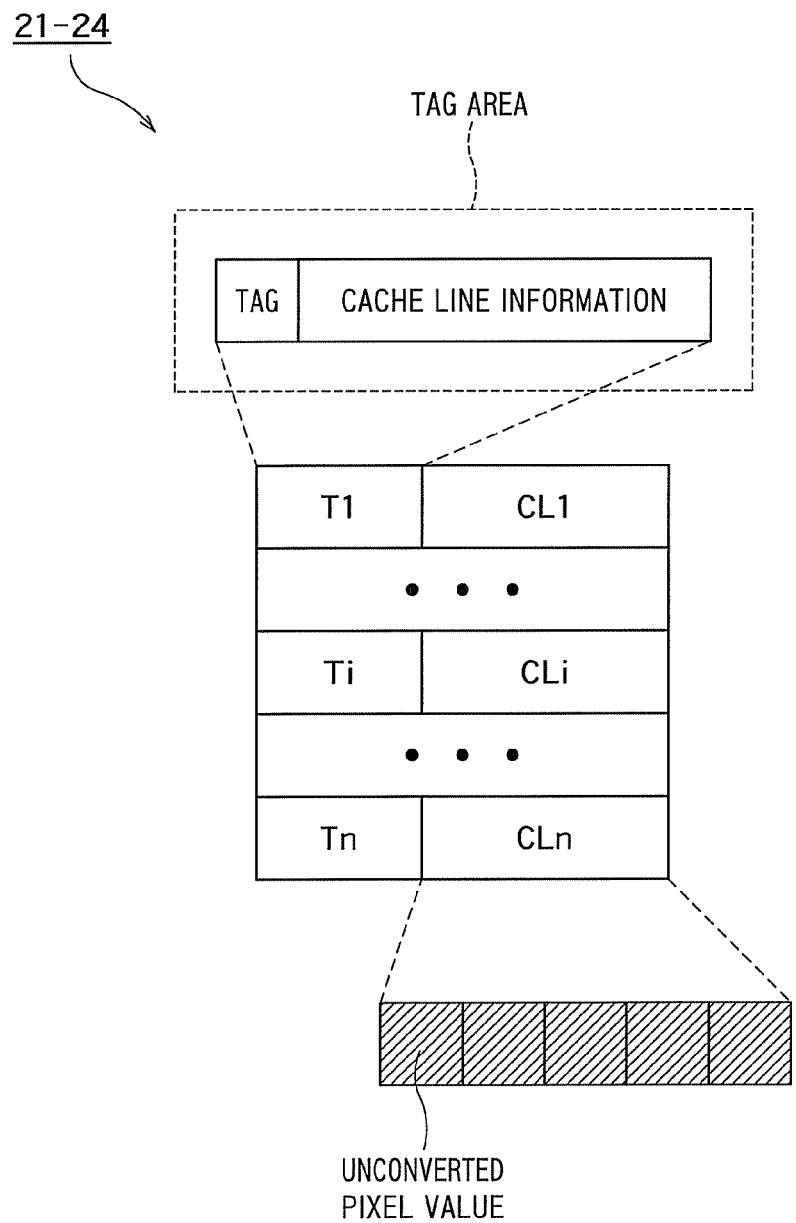
FIG. 4 is a block diagram of the first to fourth cache blocks 21 to 24 of the embodiment.

Configurations of the first to fourth cache blocks 21 to 24 of the embodiment will be described below. FIG. 4 is a block diagram of the first to fourth cache blocks 21 to 24 of the embodiment. Each of the first to fourth cache blocks 21 to 24 includes plural cache lines $CL_i$ (i=1 to n (n is an integer of 2 or more)) and plural tag areas $T_i$. The pixel values of unconverted image corresponding to a cache line size are stored in the cache line $CL_i$. The cache line size is equal to a size in which an even numbers of pixel values can be stored. A tag and cache line information are stored in the tag area $T_i$. The tag is information specifying plural pixel values of unconverted image stored in the cache line $CL_i$. The cache line information indicates a state of the cache line $CL_i$. For example, the cache line information indicates whether or not the cache line $CL_i$ is being fetched, and whether or not the pixel value of unconverted image stored in the cache line $CL_i$ is valid (that is, whether or not the pixel value of unconverted image necessary for the calculation of the pixel value of converted image is stored).

The counter 11 determines a coordinate within converted image according to a predetermined execution sequence. The coordinate of converted image corresponds one-on-one to an address of the second area 32. The coordinate determination module 12 calculates one corresponding coordinate from the coordinate within converted image, and determines plural coordinates within unconverted image from one corresponding coordinate. The corresponding coordinate means a reference coordinate specifying the coordinate of unconverted image corresponding to the coordinate of converted image, and occasionally can be a fractional value. The coordinates within unconverted image is an integral coordinate that is located around the corresponding coordinate. The number of coordinates within unconverted image depends on a pixel value calculation algorithm. The tag checker 13 checks the tag area $T_i$, and writes a conversion request making a request to calculate the pixel value of unconverted image in the buffer 14. The buffer 14 holds the conversion request until the cache access module 15 refers to the conversion request. The cache access module 15 specifies the coordinates within unconverted image of the pixel value of unconverted image necessary for the calculation of the pixel value of converted image based on the corresponding coordinate, and checks the tag area $T_i$ for each coordinate within unconverted image, and reads out the pixel value of unconverted image stored in the cache line $CL_i$. For example, the cache access module 15 specifies four coordinates within unconverted image from one corresponding coordinate. The pixel value calculator 16 refers to the pixel values of unconverted image and calculates the pixel value of converted image. The output module 17 outputs the pixel value of converted image to the memory controller 18. The memory controller 18 transfers the pixel values of unconverted image stored in the first area 31 to the first to fourth cache blocks 21 to 24. The memory controller 18 transfers the pixel values of converted image outputted from the output module 17 to the second area 32.

Figure 5:
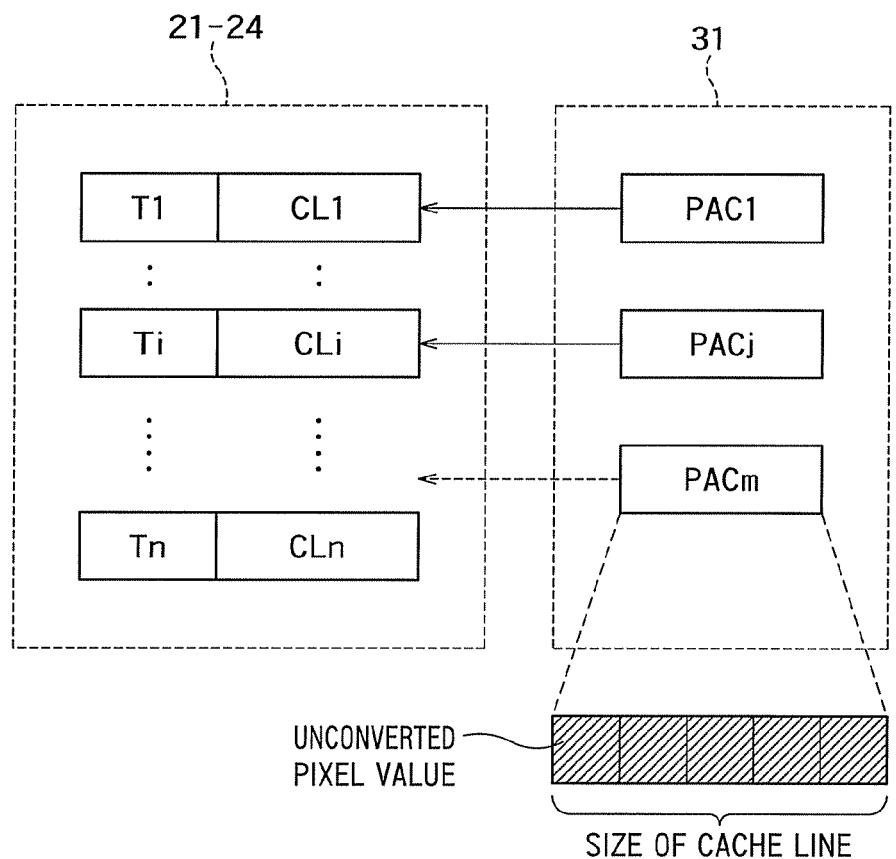
FIG. 5 illustrates the pixel values of unconverted image stored in the cache lines CLi of the first to fourth cache blocks 21 to 24 of the embodiment.
Figure 5:
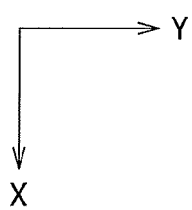

The pixel values of unconverted image stored in the cache lines $CL_i$ of the first to fourth cache blocks 21 to 24 of the embodiment will be described. FIG. 5 illustrates the pixel values of unconverted image stored in the cache lines $CL_i$ of the first to fourth cache blocks 21 to 24 of the embodiment. The pixel values of unconverted image (hereinafter referred to as "pixel package") corresponding to the cache line size are stored in the first area 31.

The pixel values of unconverted image having an even coordinate in a vertical direction (Y-direction) and an even coordinate in a horizontal direction (X-direction) in the unconverted image are stored in each cache line $CL_i$ of the first cache block 21 in an arrangement sequence on the main memory 30 according to the cache line size. A set of pixel values which can be stored in a certain cache line of the first cache block 21 is referred to as a first pixel package PAC1*j* ((j=1 to m (m is an integer of 2 or more)).

The pixel values of unconverted image having the even coordinate in the vertical direction (Y-direction) and an odd coordinate in the horizontal direction (X-direction) in the unconverted image are stored in each cache line CLi of the second cache block 22 in the arrangement sequence on the main memory 30 according to the cache line size. A set of pixel values which can be stored in a certain cache line of the second cache block 22 is referred to as a second pixel package PAC2*j*.

The pixel values of unconverted image having the odd coordinate in the vertical direction (Y-direction) and the even coordinate in the horizontal direction (X-direction) in the unconverted image are stored in each cache line CLi of the third cache block 23 in the arrangement sequence on the main memory 30 according to the cache line size. A set of pixel values which can be stored in a certain cache line of the third cache block 23 is referred to as a third pixel package PAC3*j*.

The pixel values of unconverted image having the odd coordinate in the vertical direction (Y-direction) and the odd coordinate in the horizontal direction (X-direction) in the unconverted image are stored in each cache line CLi of the fourth cache block 24 in the arrangement sequence on the main memory 30 according to the cache line size. A set of pixel values which can be stored in a certain cache line of the fourth cache block 24 is referred to as a fourth pixel package PAC4*j*.

When the number of cache line n in the cache block is lower than the number of pixel packages m, a certain pixel package m is stored in a (m % n)-th cache line. As used herein, (m % n) is a remainder when m is divided by n.

Therefore, plural pixel packages PACj can be stored in a certain cache line CLi. For example, in the case of "n=5" and "m=10", the pixel package PAC1 or PACE is stored in the cache line CL1, and the pixel package PAC2 or PAC7 is stored in the cache line CL2. At this point, two kinds of the pixel packages can be stored in the cache line CLi.

Thus, the plural pixel packages can be stored in a certain cache line CLi. Therefore, a tag (for example, (j/n)) specifying the pixel package stored in the cache line CLi is stored in the tag Ti. As used herein, (j/n) is a value in which a fractional value of a quotient is rounded down when j is divided by n.

Figure 6:
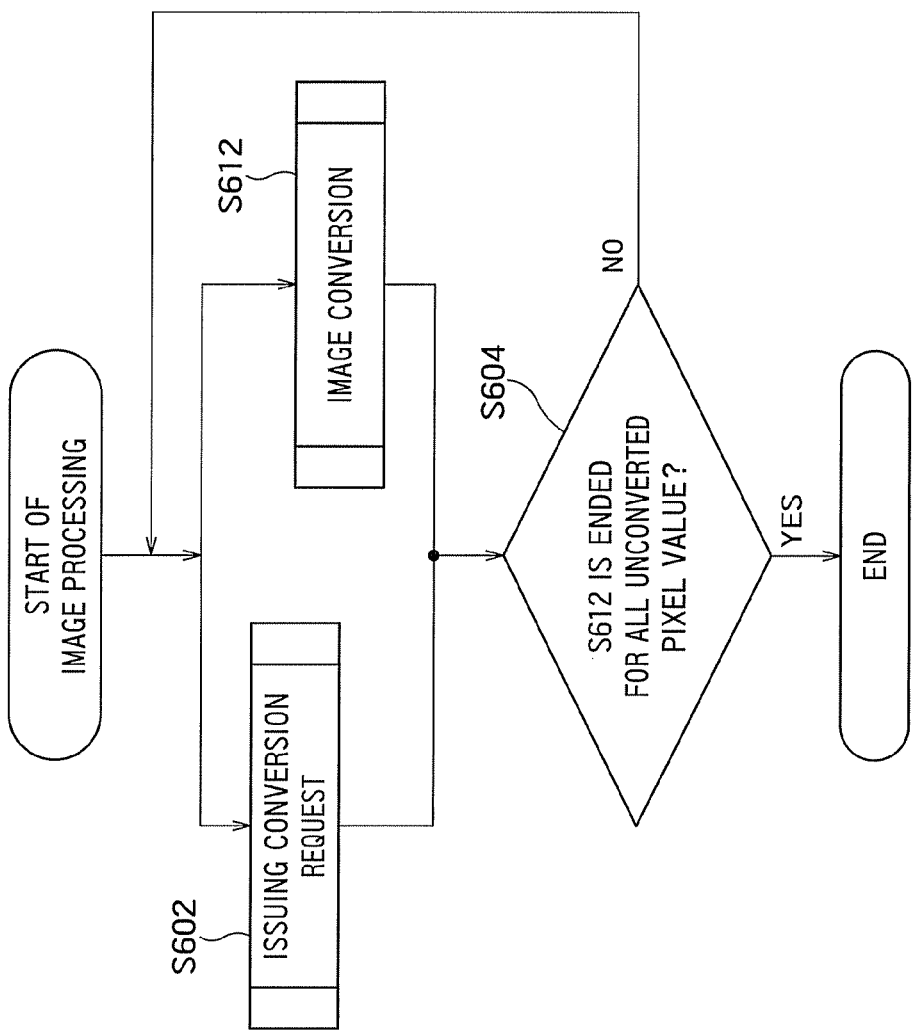
FIG. 6 is a flowchart of the image processing of the embodiment.

An operation of the image processing apparatus 10 of the embodiment will be described. FIG. 6 is a flowchart of the image processing of the embodiment. The image processing block executes issuing conversion request (S602) and image conversion (S612) in parallel. S602 is executed prior to S612 by a predetermined number of pixels. The predetermined number of pixels is substantially equal to the number of pixel values stored in one cache line. However, the predetermined number of pixels is not limited to the number of pixel values stored in one cache line, but the predetermined number of pixels can be 1 to k (k is the number of pixel values that can be stored in the buffer 14) pixels. S602 and S612 are repeatedly executed until S612 is ended to all the pixel values of unconverted image (NO in S604). When S612 is ended to all the pixel values of unconverted image (YES in S604), the image processing is ended.

Figure 7:
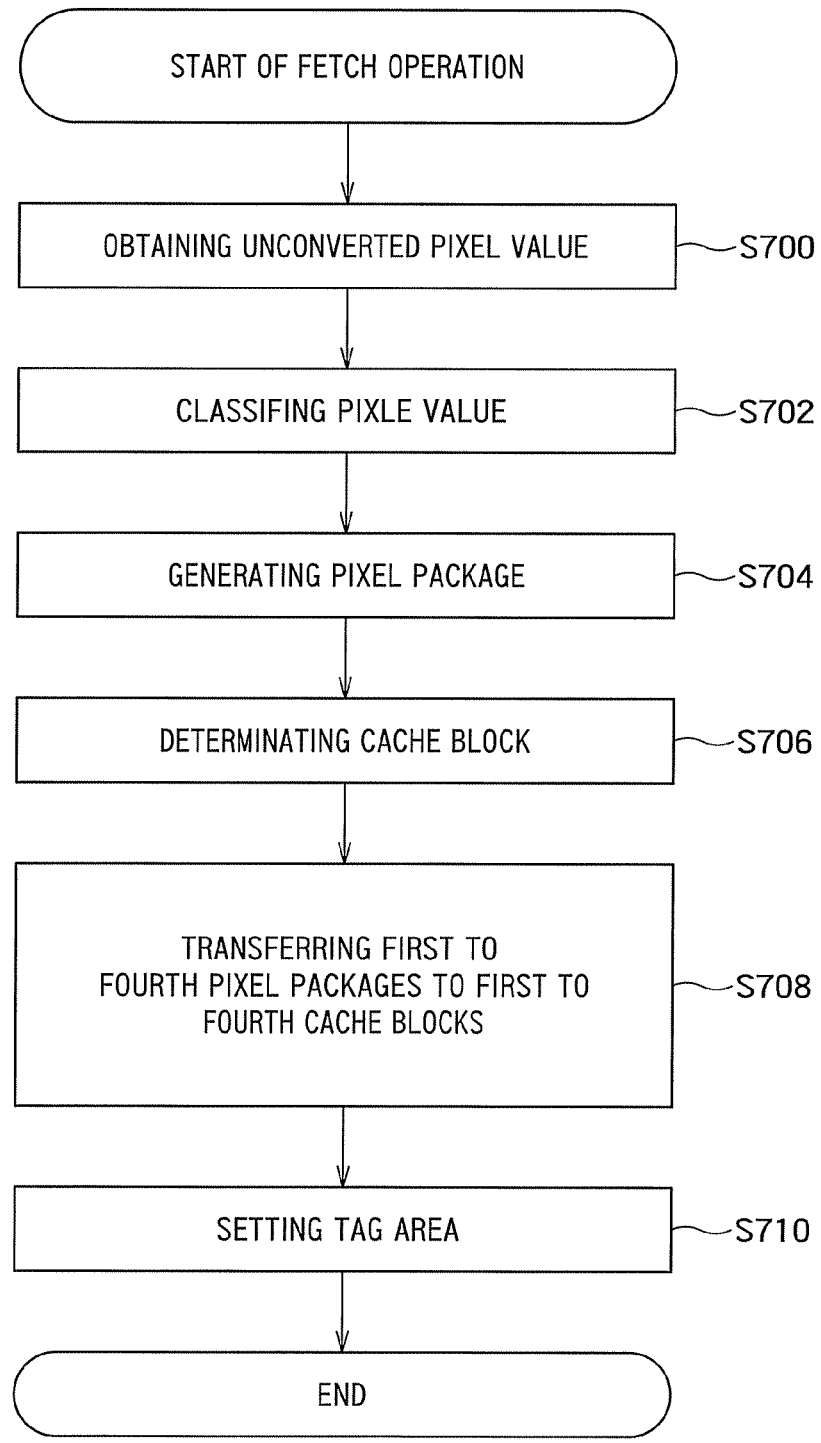
FIG. 7 is a flowchart of a fetch operation of the embodiment.

FIG. 7 is a flowchart of a fetch operation of the embodiment. The fetch operation is processing for transferring the pixels of unconverted image stored in the first storage area 31 to the first to fourth cache blocks 21 to 24 according to the coordinate within unconverted image. The fetch operation is executed when a fetch request is issued.

<S700> In response to the fetch request, the memory controller 18 obtains the pixel values of unconverted image corresponding to the two cache line sizes from the first area 31, and compiles the obtained pixel values of unconverted image into two pixel packages.

Figure 8:
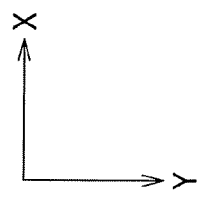

<S702> The memory controller 18 classifies the pixel values of unconverted image into first to fourth pixel values of unconverted image P1 to P4 according to the coordinate within unconverted image. FIGS. 8 and 9 illustrate classifying pixel value of the embodiment. The first to fourth pixel values of unconverted image P1 to P4 include first to fourth coordinates within unconverted image, respectively. Each of the first to fourth unconverted coordinate includes a first coordinate value (hereinafter referred to as "X-coordinate") in the horizontal direction of an unconverted image area and a second coordinate value (hereinafter referred to as "Y-coordinate") in the vertical direction of the unconverted image area. For example, the first unconverted coordinate of the first unconverted pixel value P1 has the even X-coordinate and the even Y-coordinate, the second unconverted coordinate of the second unconverted pixel value P2 has the odd X-coordinate and the even Y-coordinate, the third unconverted coordinate of the third unconverted pixel value P3 has the even X-coordinate and the odd Y-coordinate, and the fourth unconverted coordinate of the fourth unconverted pixel value P4 has the odd X-coordinate and the odd Y-coordinate.

<S704> The memory controller 18 compiles the obtained successive pixel values corresponding to the two cache line sizes into the first to fourth pixel packages PAC1*j* to PAC4*j* according to the coordinate within unconverted image.

<S706> The memory controller 18 determines the first to fourth cache blocks 21 to 24 as forwarding destination cache blocks of the first to fourth cache blocks 21 to 24 according to the coordinate within unconverted image, respectively. For example, the memory controller 18 determines the forwarding destination cache block of the first pixel package PAC1*j* formed from the plural first pixel values of unconverted image P1 including the first unconverted coordinate as the first cache block 21, and determines the forwarding destination cache block of the first pixel package PAC3*j* formed from the plural third pixel values of unconverted image P3 including the third unconverted coordinate as the third cache block 23.

<S708> memory controller 18 transfers the first to fourth pixel packages PAC1*j* to PAC4*j* to the first to fourth cache blocks 21 to 24 that are determined as the forwarding destination, respectively. At this point, j%n is a number i of the cache line in which each pixel package is stored, in which n is the number of cache lines in the cache block, and j is a number of the pixel package, and (j%n) is a remainder when j is divided by n. Therefore, the pixel values of unconverted image necessary for the calculation of the pixel value of converted image are stored in the first to fourth cache blocks 21 to 24 according to the coordinate within unconverted image.

<S710> The memory controller 18 sets the tag and the cache line information to the tag area Ti correlated with each cache line CLi of the cache block that is the forwarding destination of each pixel package. j/n is set to the tag as information specifying the plural pixel values of unconverted image (that is, pixel package) stored in the cache line CLi. Therefore, it is possible for the cache access module 15 to refer to the first to fourth pixel values of unconverted image P1 to P4 stored in the first to fourth cache blocks 21 to 24.

Figure 10:
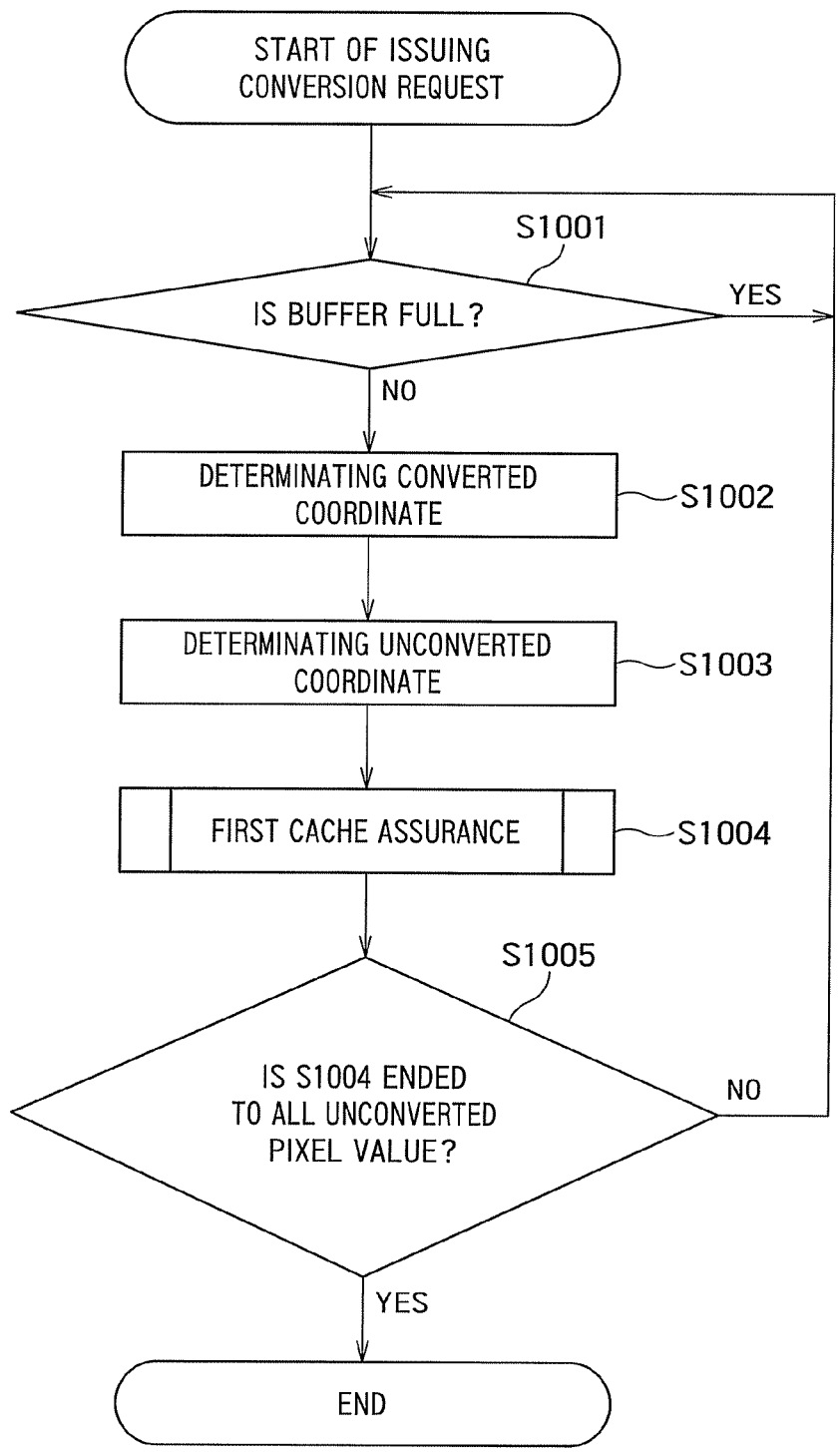
FIG. 10 is a flowchart of issuing conversion request of the embodiment.
Figure 11:
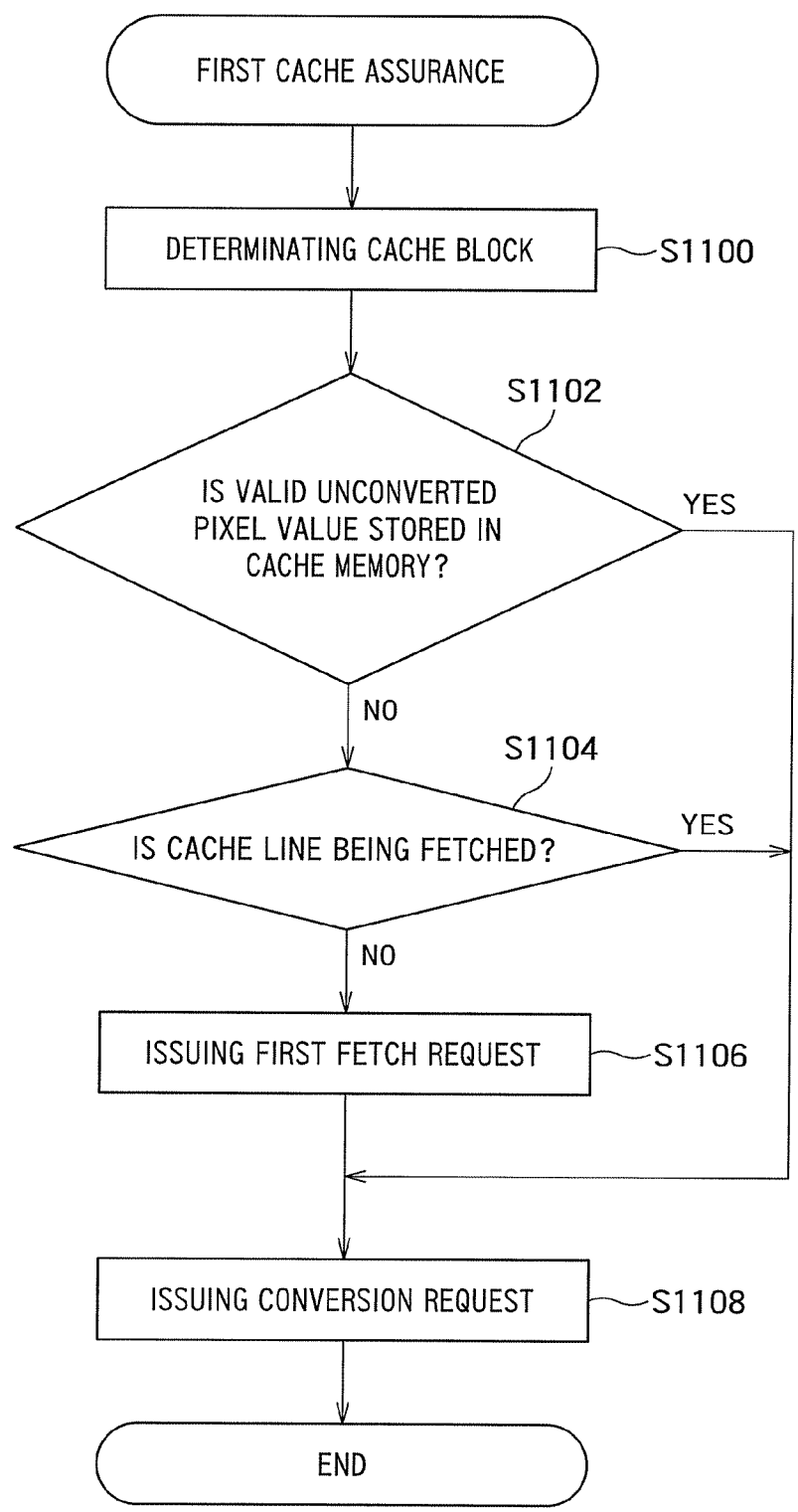
FIG. 11 is a flowchart of first cache assurance of the embodiment.

Issuing conversion request of the embodiment will be described. FIG. 10 is a flowchart of issuing conversion request of the embodiment. FIG. 11 is a flowchart of first cache assurance of the embodiment. Issuing conversion request is processing for issuing the conversion request including the coordinate within unconverted image and the coordinate of converted image. The first cache assurance is processing for assuring that the valid unconverted pixel is stored in the cache memory 20 in issuing conversion request or assuring that the cache line CLi is being fetched.

<S1001> The counter 11 determines whether or not the buffer 14 is full. When the buffer 14 is not full (NO in S1001), namely, when an empty area exists in the buffer 14, the flow goes to S1002. When the buffer 14 is full (YES in S1001), issuing conversion request waits until the empty area in the buffer 14 is formed.

<S1002> The counter 11 determines the coordinate of converted image according to a predetermined execution sequence. The coordinate of converted image corresponds one-on-one to the address of the second area 32. Therefore, when the coordinate of converted image is determined, the address of the second area 32 in which the pixel of converted image should be stored is determined. The execution sequence is determined by the conversion pattern. Specifically, the counter 11 updates the coordinate of converted image using a coordinate calculation algorithm corresponding to the conversion pattern that is obtained through the input-output interface 40. That is, the coordinate of converted image is shifted according to the execution sequence corresponding to the conversion pattern.

<S1003> The coordinate determination module 12 calculates the corresponding coordinate to specify the coordinates of the pixel values of unconverted image (that is, valid unconverted pixel value) necessary for the calculation of the pixel value of converted image. The coordinate determination module 12 uses a conversion equation to obtain the corresponding coordinate from the coordinate within converted image according to the conversion pattern. The coordinate determination module 12 calculates the coordinate within unconverted image using the conversion equation (for example, equation 1) corresponding to the conversion pattern such as the rotation, reduction, enlargement, and translational movement and the coordinate of converted image. In the equation 1, X1 and Y1 are the corresponding coordinates, and X2 and Y2 are the coordinates within converted image, and A to F are conversion parameters depending on the conversion pattern. Then the coordinate determination module 12 determines the integral coordinates around the corresponding coordinate as the coordinates within unconverted image.

$$X1 = A*X2 + B*Y2 + C$$

$$Y1 = D*X2 + E*Y2 + F \quad \text{(equation 1)}$$

<S1004> The tag checker 13 confirms whether or not the valid pixel values of unconverted image are stored in the first to fourth cache blocks 21 to 24 in each determined unconverted coordinate. The first cache assurance is executed according to the flowchart of FIG. 11.

<S1100 and S1102> Similarly to S700, the tag checker 13 determines the cache block to be checked (S1100). Then the tag checker 13 determines whether or not the valid pixel values of unconverted image are stored in the first to fourth cache blocks 21 to 24 based on the tag of the tag area Ti (S1102). Specifically, the tag checker 13 specifies the cache block and the cache line CLi in the cache block based on the coordinate within unconverted image of each pixel value of unconverted image to be referred to, and determines whether or not the valid pixel value of unconverted image is stored in the cache block based on the tag and the cache line information in the tag area Ti corresponding to the specified cache line CLi. When the valid pixel value of unconverted image is not stored in the cache block (NO in S1102), the flow goes to S1104. When the valid pixel value of unconverted image is stored in the cache block (YES in S1102), the flow goes to S1108.

For example, the tag checker 13 calculates the number j of the pixel package using an equation 2. In the equation 2, x and y are the coordinates within unconverted image, w is the number of pixel values in the X-direction of the unconverted image, p is the number of pixel values included in the pixel package, and n is the number of pixel packages stored in the cache block. As a result, the number i of the cache line CLi of the cache block in which the pixel package PACj should be stored becomes j%n.

$$j = \frac{((y \div 2) * (w \div 2) + (x \div 2))}{p} \quad \text{(equation 2)}$$

The tag checker 13 determines that the valid pixel value of unconverted image is stored in the cache block when the tag stored in the tag area Ti corresponding to the cache line CLi is j/n.

<S1104> The tag checker 13 determines whether or not the cache line CLi of each of the first to fourth cache blocks 21 to 24 is being fetched based on the cache line information in the tag area Ti. When the cache line CLi is not being fetched (NO in S1104), the flow goes to S1106. When the cache line CLi is being fetched (YES in S1104), the flow goes to S1108.

<S1106> The tag checker 13 issues a first fetch request. The first fetch request is a signal that makes a request for a fetch operation of FIG. 7 to the memory controller 18 while updating the cache line information to "the cache line is being fetched". The memory controller 18 executes the fetch operation in response to the first fetch request to transfer the pixel values of unconverted image stored in the first storage area 31 to the first to fourth cache blocks 21 to 24. When issuing the first fetch request, the tag checker 13 executes S1108 without waiting for the end of access to the main memory 30.

<S1108> The tag checker 13 issues a conversion request. The conversion request includes the coordinate of converted image determined in S1002 and the coordinate within unconverted image determined in S1003. The conversion request is a command that makes a request to calculate the pixel value of converted image corresponding to the coordinate of converted image to the image processing block. The issued conversion request is held by the buffer 14 until the cache access module 15 reads out the conversion request. When S1108 is ended, the first cache assurance is ended, and the flow goes to S1005.

<S1005> S1001 to S1004 are repeatedly executed until the first cache assurance is ended to all the pixel values of unconverted image (NO in S1005). When the first cache assurance is ended to all the pixel values of unconverted image (YES in S1005), issuing conversion request is ended, and the flow goes to S604.

Figure 12:
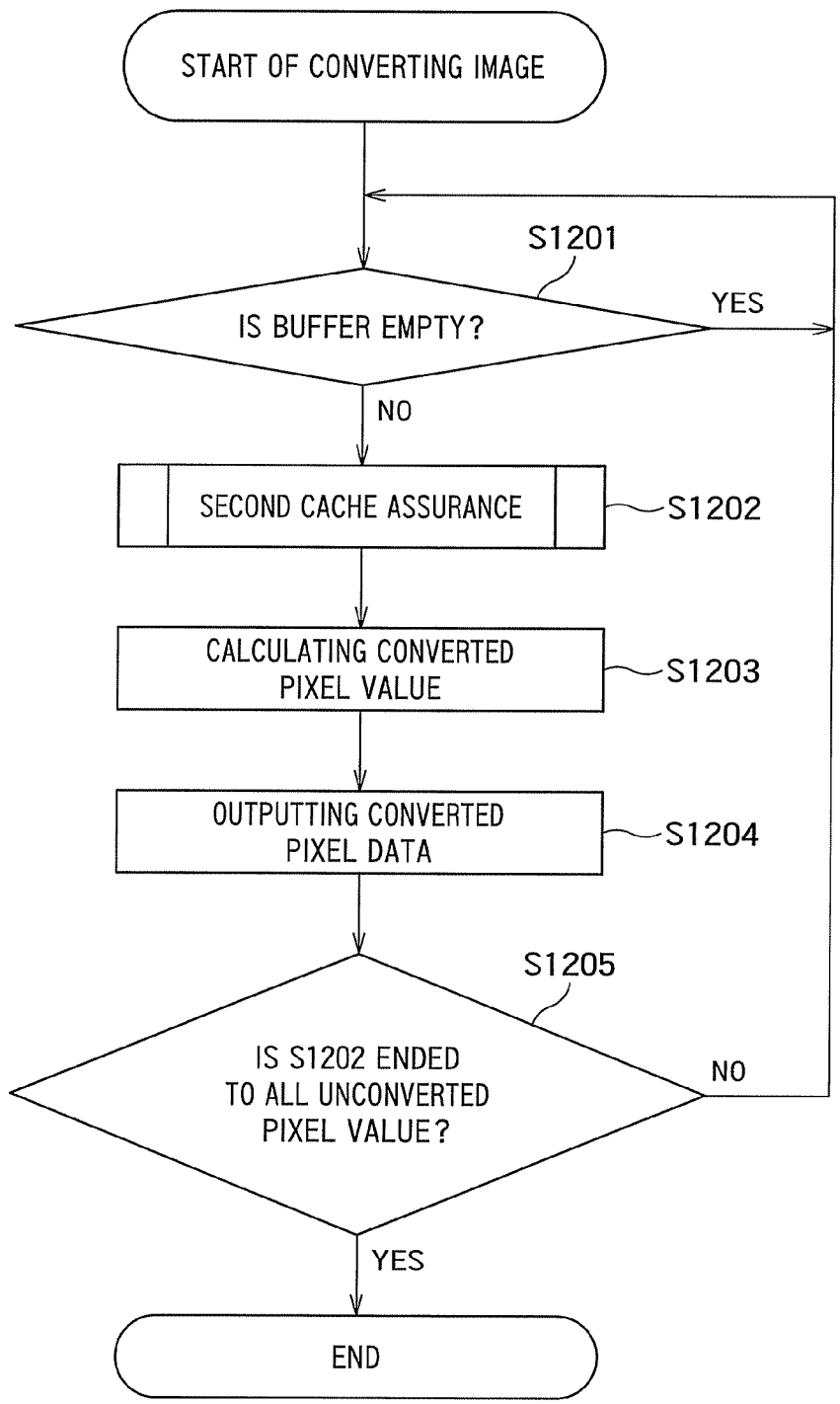
FIG. 12 is a flowchart of the image conversion of the embodiment.
Figure 13:
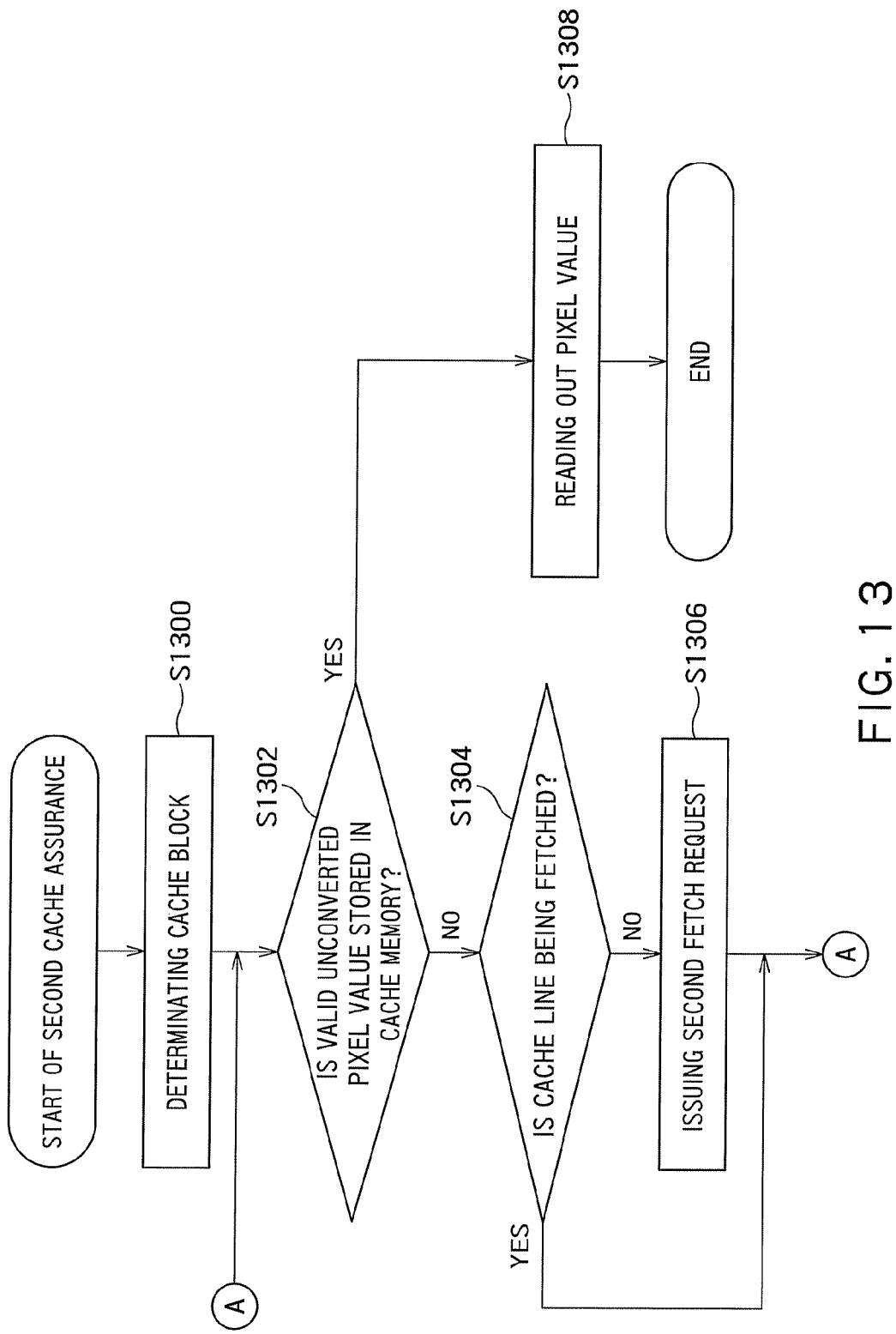
FIG. 13 is a flowchart of second cache assurance of the embodiment.

Then image conversion of the embodiment will be described. FIG. 12 is a flowchart of the image conversion of the embodiment. FIG. 13 is a flowchart of second cache assurance of the embodiment. The image conversion is processing for calculating the pixel value of converted image by referring to the pixel values of unconverted image stored in the first to fourth cache blocks 21 to 24. The second cache assurance is processing for assuring that the valid pixel values of unconverted image are stored in the first to fourth cache blocks 21 to 24 during the image conversion.

<S1201> When the buffer 14 is not empty (that is, the conversion request exists in the buffer 14) (NO in S1201), namely, when at least one conversion request exists in the buffer 14, the flow goes to S1202. When the buffer 14 is empty (that is, the conversion request does not exist in the buffer 14) (YES in S1201), the flow goes to S1202 after the buffer 14 is not empty.

<S1202> The cache access module 15 reads out the pixel values of unconverted image from the first to fourth cache blocks 21 to 24 when the pixel values of unconverted image corresponding to the coordinate within unconverted image to be referred to in the conversion request held by the buffer 14 in the first cache assurance are stored in the first to fourth cache blocks 21 to 24. The second cache assurance is executed according to the flowchart of FIG. 13.

<S1300 and S1302> Similarly to S700, the cache access module 15 determines the cache block to be checked (S1300). Then the cache access module 15 determines whether or not the valid pixel values of unconverted image are stored in the first to fourth cache blocks 21 to 24 based on the tag in the tag area Ti (S1302). Specifically, the cache access module 15 specifies the cache block and the cache line CLi in the cache block based on the coordinate within unconverted image of each pixel value of unconverted image to be referred to, and determines whether or not the valid pixel value of unconverted image is stored in the cache block based on the tag and the cache line information in the tag area Ti corresponding to the specified cache line CLi. When the valid pixel value of unconverted image is not stored in the cache block (NO in S1302), the flow goes to S1304. When the valid pixel value of unconverted image is stored in the cache block (YES in S1302), the flow goes to S1308.

<S1304> The cache access module 15 determines whether or not the cache line CLi is being fetched based on the cache line information. When the cache line CLi is not being fetched (NO in S1304), the flow goes to S1306. When the cache line CLi is being fetched (YES in S1304), the flow returns to S1302.

<S1306> The cache access module 15 issues a second fetch request. The second fetch request is a signal that makes a request for the fetch operation to the memory controller 18 while updating the cache line information to "the cache line is being fetched". The memory controller 18 executes the fetch operation and transfers the pixel value of unconverted image stored in the first storage area 31 in the fetch operation of FIG. 7 to one of the first to fourth cache blocks 21 to 24 according to the coordinate within unconverted image. When S1306 is ended, the flow returns to S1302.

<S1308> The cache access module 15 reads out the first to fourth pixel values of unconverted image P1 to P4 stored in the first to fourth cache blocks 21 to 24 by one-time cache access. The first to fourth pixel values of unconverted image P1 to P4 corresponding to four coordinates within unconverted image (0,0), (1,0), (0,1), and (1,1) that are determined from one corresponding coordinate which corresponds to one converted coordinate are stored in the first to fourth cache blocks 21 to 24. At this point, the cache access module 15 reads out the first pixel value of unconverted image P1 (0,0) stored in the first cache block 21, the second pixel value of unconverted image P2 (1,0) stored in the second cache block 22, the third pixel value of unconverted image P3 (0,1) stored in the third cache block 23, and the fourth pixel value of unconverted image P4 (1,1) stored in the fourth cache block 24 by the one-time cache access. When S1308 is ended, the second cache assurance is ended, and the flow goes to S1203.

<S1203> The pixel value calculator 16 calculates the pixel value of converted image by referring to the first to fourth pixel values of unconverted image P1 to P4 read out from the first to fourth cache blocks 21 to 24. Specifically, the pixel value calculator 16 refers to the first to fourth pixel values of unconverted image P1 to P4 according to the pixel value calculation algorithm corresponding to the conversion pattern that is obtained through the input-output interface 40, and the pixel value calculator 16 calculates the pixel value of converted image. For example, the pixel value calculation algorithm is a weighted average algorithm.

<S1204> The output module 17 outputs the pixel value of converted image calculated in S1203 to the memory controller 18. The memory controller 18 transfers the pixel value of converted image outputted from the output module 17 to an address of the second area 32. The address of the second area 32 corresponds to the coordinate of converted image of the conversion request held by the buffer 14.

<S1205> S1201 to S1204 are repeatedly executed until the second cache assurance is ended to all the pixel values of unconverted image (NO in S1205). When the second cache assurance is ended to all the pixel values of unconverted image (YES in S1205), the image conversion is ended, and the flow goes to S604.

In the embodiment, the weighted average method in which the four pixel values of unconverted image are referred to, in order to calculate the pixel value of converted image is described by way of example. The scope of the invention is not limited to the weighted average method, but the invention can be applied to any method in which plural pixel values of unconverted image are referred to, in order to calculate the pixel value of converted image.

Figure 14:
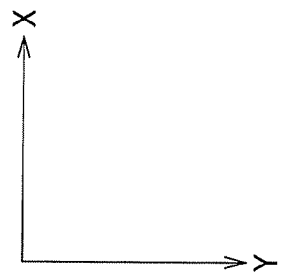

For example, in the case of a bi-cubic method in which the pixel value of converted image is calculated by referring to the four pixel values of unconverted image in the X-direction and the four pixel values of unconverted image in the Y-direction (that is, 16 pixel values of unconverted image), the eight cache blocks (first to eighth cache blocks) are prepared in the cache memory 20. The memory controller 18 classifies the pixel values of unconverted image into eight kinds according to the coordinate within unconverted image. FIGS. 14 and 15 illustrate classification of pixel value according to a modification of the embodiment. For example, in the case of the unconverted image data having four pixels in the X-direction and the four pixels in the Y-direction, the memory controller 18 classifies the pixel value of unconverted image of the unconverted image data into one of the first to eighth pixel values of unconverted image P1 to P8 according to the even or the odd of the quotient (X-coordinate/the number of pixels corresponding to cache line size) when the X-coordinate is divided by the number of pixels that can be stored in one cache line and the remainder (the number of pixels to be referred to in Y-coordinate MOD Y-direction) when the Y-coordinate is divided by the number of pixels to be referred to in the Y-direction. For example, in the first, third, fifth, and seventh pixel values of unconverted image P1, P3, P5, and P7, the quotient is the even when the X-coordinate is divided by the number of pixels that can be stored in one cache line, and the remainder is 0 to 3 when the Y-coordinate is divided by the number of pixels to be referred to in the Y-direction. In the second, fourth, sixth, and eighth pixel values of unconverted image P2, P4, P6, and P8, the quotient is the odd when the X-coordinate is divided by the number of pixels that can be stored in one cache line, and the remainder is 0 to 3 when the Y-coordinate is divided by the number of pixels to be referred to in the Y-direction. Then the memory controller 18 determines the first to eighth cache blocks as the forwarding destination cache block of the pixel package formed from the first to eighth pixel values of unconverted image P1 to P8.

Not only the successive pixel values of unconverted image in the X-direction but also the successive pixel values of unconverted image in the Y-direction are required to calculate the pixel value of converted image. If the arrangement of the pixel values of unconverted image stored in the cache line CLi is identical to that of the unconverted image data in the X-direction, only the successive pixel values of unconverted image in the X-direction are stored in the cache line CLi. At this point, only the successive pixel values of unconverted image in the X-direction corresponding to the cache line size can be referred to by the one-time cache access. That is, all the pixel values of unconverted image necessary for the calculation of the pixel value of converted image cannot be referred to by the one-time cache access.

On the other hand, according to the embodiment, the memory controller 18 determines the cache block as the forwarding destination according to the position of each cache line size in the X-coordinate and the remainder that is obtained by dividing the Y-coordinate by the number of pixels to be referred to in the Y-direction. The pixel value of unconverted image is stored in the cache line CLi of the cache block corresponding to the coordinate within unconverted image. As a result, the pixel values of unconverted image having the successive coordinate corresponding to the number of cache lines in the X-direction are stored in the cache line CLi of each cache block. The successive pixel values of unconverted image in the Y-direction are stored in the different cache blocks at intervals of two cache blocks. At this point, plural pixel values of unconverted image having the successive coordinates corresponding to the cache line size in the X-direction and the successive coordinates corresponding to a half of the number of cache blocks in the Y-direction can be referred to by the one-time cache access.

In other words, the memory controller 18 of the embodiment transfers the plural pixel values of unconverted image to the cache blocks such that the pixel values of unconverted image are successively arrayed in the X-direction in the cache lines CLi of the plural cache blocks and such that the pixel values of unconverted image are successively arrayed in the Y-direction in the plural cache blocks.

In the embodiment, the first cache assurance can be omitted. If the first cache assurance is omitted, the memory controller 18 executes the fetch operation only when the second fetch request is issued.

At least a portion of the image processing system 1 according to the above-described embodiments may be composed of hardware or software. When at least a portion of the image processing system 1 is composed of software, a program for executing at least some functions of the image processing system 1 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing system 1 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing apparatus connectable to a main memory in which a plurality of pixel values of unconverted image is stored and a cache memory comprising a plurality of cache blocks, each of the cache blocks comprising a plurality of cache lines, the apparatus comprising:
a counter configured to determine a coordinate within converted image according to a predetermined execution sequence;
a coordinate determination module configured to determine a plurality of coordinates within unconverted image of the pixel values of unconverted image necessary to calculate a pixel value of converted image corresponding to the coordinate within converted image;
a memory controller configured to obtain the pixel values of unconverted image from the main memory in units of the cache lines and transfer the obtained pixel values of unconverted image to the cache blocks corresponding to each of the coordinates within unconverted image;
a cache access module configured to read out all the pixel values of unconverted image necessary to calculate the pixel value of converted image from the cache blocks;
a pixel value calculator configured to calculate the pixel value of converted image by referring to the pixel values of unconverted image read out by the cache access module; and
an output module configured to output the pixel value of converted image,
wherein:
the cache blocks comprise a first cache block to a fourth cache block,
the memory controller is configured to select a forwarding destination cache block from the first cache block to the fourth cache block based on a combination of an even or odd number of a first coordinate value in a horizontal direction and an even or odd number of a second coordinate value in a vertical direction, and
the pixel value calculator is configured to calculate the pixel value of the converted image based on referenced pixel values of the unconverted image stored in the first cache block to the fourth cache block.

2. The apparatus of claim 1, wherein the memory controller is configured to transfer a first pixel value of the unconverted image comprising the even first coordinate value and the even second coordinate value to the first cache block, to transfer a second pixel value of the unconverted image comprising the odd first coordinate value and the even second coordinate value to the second cache block, to transfer a third pixel value of the unconverted image comprising the even first coordinate value and the odd second coordinate value to the third cache block, and to transfer a fourth pixel value of the unconverted image comprising the odd first coordinate value and the odd second coordinate value to the fourth cache block.

3. An image processing apparatus connectable to a main memory in which a plurality of pixel values of unconverted image is stored and a cache memory comprising a plurality of cache blocks, each of the cache blocks comprising a plurality of cache lines, the apparatus comprising:

a counter configured to determine a coordinate within converted image according to a predetermined execution sequence;

a coordinate determination module configured to determine a plurality of coordinates within unconverted image of the pixel values of unconverted image necessary to calculate a pixel value of converted image corresponding to the coordinate within converted image;

a memory controller configured to obtain the pixel values of unconverted image from the main memory in units of the cache lines and transfer the obtained pixel values of unconverted image to the cache blocks corresponding to each of the coordinates within unconverted image;

a cache access module configured to read out all the pixel values of unconverted image necessary to calculate the pixel value of converted image from the cache blocks;

a pixel value calculator configured to calculate the pixel value of converted image by referring to the pixel values of unconverted image read out by the cache access module; and an output module configured to output the pixel value of converted image, wherein the memory controller is configured to determine a forwarding destination cache block based on an even or odd number of a quotient when a first coordinate value in a horizontal direction is divided by a number of pixels stored in one cache line of the cache memory, and based on an even or odd number of a remainder when a second coordinate in a vertical direction is divided by a number of pixels referenced in the vertical direction.

4. The apparatus of claim 3, wherein a number of the cache blocks is twice as many as a number of pixels referenced in a vertical direction, and the pixel value calculator is configured to reference the pixel values of the unconverted image stored in the cache block, and to calculate the pixel values of the converted image based on the referenced pixel values.

5. The apparatus of claim 4, wherein the memory controller is configured to transfer the pixel corresponding to the quotient whose number is even to the cache block corresponding to the number which is twice as many as the remainder, and to transfer the pixel corresponding to the quotient whose number is odd to the cache block corresponding to the number which is 1 plus twice as many as the remainder.

6. An image processing apparatus connectable to a main memory in which a plurality of pixel values of unconverted image is stored and a cache memory comprising a plurality of cache blocks, each of the cache blocks comprising a plurality of cache lines, the apparatus comprising:

a counter configured to determine a coordinate within converted image according to a predetermined execution sequence;

a coordinate determination module configured to determine a plurality of coordinates within unconverted image of the pixel values of unconverted image necessary to calculate a pixel value of converted image corresponding to the coordinate within converted image;

a memory controller configured to obtain the pixel values of unconverted image from the main memory in units of the cache lines and transfer the obtained pixel values of unconverted image to the cache blocks corresponding to each of the coordinates within unconverted image;

a cache access module configured to read out all the pixel values of unconverted image necessary to calculate the pixel value of converted image from the cache blocks;

a pixel value calculator configured to calculate the pixel value of converted image by referring to the pixel values of unconverted image read out by the cache access module; and an output module configured to output the pixel value of converted image, wherein the memory controller is configured to transfer the pixel values of the unconverted image to the cache blocks, to successively store the pixel values of the unconverted image in a cache line of the cache memory in a horizontal direction, and to successively store the pixel values of the unconverted image in the cache blocks in a vertical direction.

7. An image processing system comprising:

a main memory configured to store a plurality of pixel values of unconverted image;

a cache memory comprising a plurality of cache blocks, each of the cache blocks comprising a plurality of cache lines;

a counter configured to determine a coordinate within converted image according to a predetermined execution sequence;

a coordinate determination module configured to determine a plurality of coordinates within unconverted image of the pixel values of unconverted image necessary to calculate a pixel value of converted image corresponding to the coordinate within converted image;

a memory controller configured to obtain the pixel values of unconverted image from the main memory in units of the cache lines and transfer the obtained pixel values of unconverted image to the cache blocks corresponding to each of the coordinates within unconverted image;

a cache access module configured to read out all the pixel values of unconverted image necessary to calculate the pixel value of converted image from the cache blocks;

a pixel value calculator configured to calculate the pixel value of converted image by referring to the pixel values of unconverted image read out by the cache access module; and an output module configured to output the pixel value of converted image, wherein:

the cache blocks comprise a first cache block to a fourth cache block, the memory controller is configured to select a forwarding destination cache block from the first cache block to the fourth cache block based on a combination of an even or odd number of a first coordinate value in a horizontal direction and an even or odd number of a second coordinate value in a vertical direction, and the pixel value calculator is configured to reference the pixel values of the unconverted image stored in the first cache block to the fourth cache block, and to calculate the pixel value based on the referenced pixel values.

8. The system of claim 7, wherein the memory controller is configured to transfer a first pixel value of the unconverted image comprising the even first coordinate value and the even second coordinate value to the first cache block, to transfer a second pixel value of the unconverted image comprising the odd first coordinate value and the even second coordinate value to the second cache block, to transfer a third pixel value of the unconverted image comprising the even first coordinate value and the odd second coordinate value to the third cache block, and to transfer a fourth pixel value of the unconverted image comprising the odd first coordinate value and the odd second coordinate value to the fourth cache block.

9. An image processing system comprising:
a main memory configured to store a plurality of pixel values of unconverted image;
a cache memory comprising a plurality of cache blocks, each of the cache blocks comprising a plurality of cache lines;
a counter configured to determine a coordinate within converted image according to a predetermined execution sequence;
a coordinate determination module configured to determine a plurality of coordinates within unconverted image of the pixel values of unconverted image necessary to calculate a pixel value of converted image corresponding to the coordinate within converted image;
a memory controller configured to obtain the pixel values of unconverted image from the main memory in units of the cache lines and transfer the obtained pixel values of unconverted image to the cache blocks corresponding to each of the coordinates within unconverted image;
a cache access module configured to read out all the pixel values of unconverted image necessary to calculate the pixel value of converted image from the cache blocks;
a pixel value calculator configured to calculate the pixel value of converted image by referring to the pixel values of unconverted image read out by the cache access module; and
an output module configured to output the pixel value of converted image,
wherein the memory controller is configured to determine a forwarding destination cache block based on an even or odd number of a quotient when a first coordinate value in a horizontal direction is divided by a number of pixels stored in one cache line of the cache memory, and based on an even or odd number of a remainder when a second coordinate in a vertical direction is divided by a number of pixels to be referred to in the vertical direction.

10. The system of claim 9, wherein
a number of the cache blocks is twice as many as a number of pixels referenced in a vertical direction,
and
the pixel value calculator is configured to reference the pixel values of the unconverted image stored in the cache block, and to calculate the pixel values of the converted image based on the referenced pixel values.

11. The system of claim 10, wherein the memory controller is configured to transfer the pixel corresponding to the quotient whose number is even to the cache block corresponding to the number which is twice as many as the remainder, and to transfer the pixel corresponding to the quotient whose number is odd to the cache block corresponding to the number which is 1 plus twice as many as the remainder.

12. An image processing system comprising:
a main memory configured to store a plurality of pixel values of unconverted image;
a cache memory comprising a plurality of cache blocks, each of the cache blocks comprising a plurality of cache lines;
a counter configured to determine a coordinate within converted image according to a predetermined execution sequence;
a coordinate determination module configured to determine a plurality of coordinates within unconverted image of the pixel values of unconverted image necessary to calculate a pixel value of converted image corresponding to the coordinate within converted image;
a memory controller configured to obtain the pixel values of unconverted image from the main memory in units of the cache lines and transfer the obtained pixel values of unconverted image to the cache blocks corresponding to each of the coordinates within unconverted image;
a cache access module configured to read out all the pixel values of unconverted image necessary to calculate the pixel value of converted image from the cache blocks;
a pixel value calculator configured to calculate the pixel value of converted image by referring to the pixel values of unconverted image read out by the cache access module; and
an output module configured to output the pixel value of converted image,
wherein the memory controller is configured to transfer the pixel values of the unconverted image to the cache blocks, to successively store the pixel values of the unconverted image in a cache line of the cache memory in a horizontal direction, and to successively store the pixel values of the unconverted image in the cache blocks in a vertical direction.

* * * * *